United States Patent Office 3,516,803
Patented June 23, 1970

3,516,803
METHOD FOR THE PURIFICATION OF TRICHLOROSILANE
Herbert J. Moltzan and De Winn Fyffe, Dallas, Tex., assignors to Texas Instruments Incorporated, Dallas, Tex., a corporation of Delaware
No Drawing. Filed Oct. 6, 1966, Ser. No. 584,646
Int. Cl. C01b 33/08
U.S. Cl. 23—366      3 Claims

ABSTRACT OF THE DISCLOSURE

A method of purifying trichlorosilane by heating the impure trichlorosilane to a temperature just below its boiling point, maintaining this temperature for a sufficient period of time to allow evaporation of trichlorosilane vapors, and subsequently condensing the purified vapors and collecting the condensate. This process is an improvement over conventional distillation techniques, since the latter cause bubbling of the trichlorosilane and corresponding entrainment of impurity-containing liquid droplets in the trichlorosilane distillate.

---

This invention relates to the purification of trichlorosilane, and more particularly to the purification of trichlorosilane containing volatile compounds of elements, such as boron and phosphorus, that form electrically active carriers in silicon.

Trichlorosilane ($SiHCl_3$) is a silicon containing material which can be readily reduced for forming silicon bodies used in the manufacture of electronic elements, such as transistors and the like. For such uses, it is of considerable advantage to have a relatively pure trichlorosilane. The contaminants or impurities of principal concern are those impurities which greatly reduce the resistivity of the silicon formed by reduction of the trichlorosilane. For example, one part per billion, atomic ratio, of a P-type impurity, i.e., a group III metal such as boron, is believed to reduce the resistivity of pure silicon from about 230,000 ohm-centimeters (theoretical) to 285 ohm-centimeters. N-type impurities (group V and VI metals) also affect the electrical properties. For example, one part per billion, atomic ratio, of an N-type impurity such as phosphorus is believed to reduce the resistivity of pure silicon from about 230,000 ohm-centimeters (theoretical) to 85 ohm-centimers, all of which is known to those skilled in the art.

The principal impurities affecting electrical properties of silicon are boron (P-type) and phosphorus (N-type) and efforts have been made to remove these impurities by distillation. While the exact nature of these impurities as they appear in commercial trichlorosilane is unknown, several assumptions can be made. Boron is probably present as boron trichloride ($BCl_3$). This material boils at 12.5° C. and would be expected to come over during the early part of a distillation since the boiling point of trichlorosilane is 31.8° C. Phosphorus, however, can be present as phosphorus trichloride ($PCl_3$), phosphine ($PH_3$), diphosphine ($P_2H_4$), or possibly as an intermediate phosphorus-hydrogen-halide compound. The intermediates are not characterized in the literatures but have been postulated. Phosphorus trichloride boils at 75.5° C. and would be expected to remain in the "bottoms" during distillation. Phosphine, on the other hand, is a colorless gas having a boiling point of −85° C. and would very readily distill at normal trichlorosilane boiling temperature. The postulated intermediate phosphorus-hydrogen-halide compounds would have properties between phosphorus trichloride and phosphine. Diphosphine has been reported to boil between 51° C. and 56° C. It does decompose, however, to phosphine and an intermediate $(PH)_x$ which eventually reduces further to phosphine and phosphorus. The phosphine ($PH_3$) would, as mentioned, because of its low boiling point go over with the distillate. Diphosphine decomposes to form phosphine ($PH_3$) at a rate that increases with increasing temperatures and the phosphine so formed will be found in the distillate.

Distillation techniques have also been applied for the removal from trichlorosilane of volatile compounds of elements that form electrically active carriers in silicon. These techniques are only partially successful, however, in that small amounts of impurities remain in the trichlorosilane, and these small amounts are sufficient to affect the electrical characteristics of the silicon metal that is produced. Distillation does not completely remove these impurities because of the entrainment of very minute amounts of liquid in each gas bubble or in the gas phase formed during the distillation. These minute amounts of liquid present in the gas or vapor phase originate from the crude trichlorosilane being distilled and are consequently rich in impurity content. Therefore, these contaminants being entrained, are not separated by the distillation and thereby result in a distilled trichlorosilane still containing small but significant amounts of impurities that will affect the electrical characteristics of silicon.

Efforts have also been made at removing the impurities by chemical treatment of the trichlorosilane, but such efforts are expensive and generally unsatisfactory due to the possibility of contamination from the treating agent.

The present invention is an improved method for purifying trichlorosilane and may generally be described as including the steps of heating the impure trichlorosilane to a temperature just below its boiling point, condensing the vapors produced and collecting the condensate.

The method of the present invention lessens or eliminates the possibility of diphosphine ($P_2H_4$) decomposition to phosphine ($PH_3$) because of close temperature control and the elimination of "hot spots" which are present in any distillation. It also eliminates the possibility of entrainment of impurities in the vapors which emanate from a distillation column since there is no boiling of the trichlorosilane.

The method of the present invention may be practiced by use of various type equipment, but because of the nature of trichlorosilane, the equipment is preferably constructed of quartz, Teflon or a mild steel, though other materials are suitable. To illustrate the effectiveness of the method of the invention and its adaptability to various type systems, the following examples are given.

CLOSED QUARTZ SYSTEM

Example 1

A quartz flask was connected at the top by a piece of quartz tubing to a Teflon bottle immersed in Dry Ice and water. All equipment which was to contact the trichlorosilane was etched with hydrofluoric acid and washed with deionized water. The flask was charged with 2150 milliliters of an impure mixture of 60 percent by volume trichlorosilane and 40 percent by volume silicon tetrachloride ($SiCl_4$) which was heated to and maintained at 31° C. in a water bath. A quantity of 450 milliliters of condensate was collected and the analysis of the feed, condensate, and residue is tabulated below:

| | P-type impurity (parts per billion) | N-type impurity (parts per billion) |
|---|---|---|
| Feed | 0.88 | 96.00 |
| Distillate | 0.08 | 0.28 |
| Residue | 0.29 | 91.00 |

Example 2

The same equipment described in Example 1 was charged with 2590 grams of impure trichlorosilane which was brought to and maintained between 30° C. and 31.8° C. in a water bath and 780 grams of condensate was collected, with the analysis of the feed, condensate and residue tabulated below:

|  | P-type impurity (parts per billion) | N-type impurity (parts per billion) |
|---|---|---|
| Feed | 0.11 | 1.93 |
| Condensate | 0.03 | 0.13 |
| Residue | 0.20 | 0.83 |

VENTED QUARTZ SYSTEM

Example 3

The vented quartz system utilized a quartz flask which is connected to a quartz condenser having a jacket through which flowed water maintained between 8° C. and 10° C. The condenser discharged into a Teflon bottle cooled with Dry Ice and water which in turn was connected at the top by Teflon tubing to a second Teflon bottle cooled by Dry Ice and acetone. The quartz flask was charged with 3304 grams of impure trichlorosilane which was maintained between 31° C. and 31.7° C. until 3075 grams of condensate had been collected with the analysis of the feed, condensate and residue tabulated below:

|  | P-type impurity (parts per billion) | N-type impurity (parts per billion) |
|---|---|---|
| Feed | 0.39 | 0.72 |
| Condensate | 0.16 | 0.20 |
| Residue | 0.10 | 5.95 |

Example 4

The equipment of Example 3 was charged with 3825 grams of impure trichlorosilane and maintained between 30° C. and 31.8° C. until 3471 grams of condensate was collected and an analysis of the feed, condensate and residue is tabulated below:

|  | P-type impurity (parts per billion) | N-type impurity (parts per billion) |
|---|---|---|
| Feed | 0.25 | 0.30 |
| Condensate | 0.10 | 0.18 |
| Residue | 1.46 | 2.87 |

STEEL TANK SYSTEM

A horizontal steel tank provided with a weir that divided the tank into two chambers was employed in Examples 5–7. Communicating with the first chamber was a trichlorosilane charge line and positioned within the chamber below the top of the weir was a coil of tubing for heating the charged material. A drain line was provided for emptying the first chamber of residue. Within the second chamber, which communicated with the first over the top of the weir was a cooling coil for condensing vapor generated in the first chamber. The second chamber through suitable tubing emptied condensate and any uncondensed vapor into a first Teflon bottle situated in a Dry Ice and water bath. The first Teflon bottle contained a vent line to a second Teflon bottle situated in a Dry Ice and acetone bath. The second Teflon bottle was vented to the atmosphere.

Example 5

The first chamber of the tank was charged with approximately three liters of impure trichlorosilane. Water at approximately 36° C. was circulated through the coil in the first chamber in sufficient quantity to maintain the charged trichlorosilane at 29° C. Hydrogen at the rate of 1500 milliliters per minute was swept through the first chamber into the second chamber and from the second chamber through the first and second bottles to expedite the evaporation of trichlorosilane, which was 90 percent (by weight) vaporized and the impurity analysis is tabulated below:

|  | P-type impurity (parts per billion) | N-type impurity (parts per billion) |
|---|---|---|
| Feed | (¹) | (¹) |
| Condensate | 0.14 | 0.14 |
| Residue | 0.18 | 3.03 |

¹ Not analyzed.

Example 6

The same equipment, conditions and charge as described in Example 5 were used to get approximately 90 percent (by weight) condensate, but the hydrogen was swept through the system at one liter per minute and pressure in the tank was maintained between 5 and 6 p.s.i.g. and the temperature raised to 37° C. An analysis of the feed, condensate and residue is tabulated below:

|  | P-type impurity (parts per billion) | N-type impurity (parts per billion) |
|---|---|---|
| Feed | 0.90 | 0.91 |
| Condensate | 0.41 | 0.41 |
| Residue | 1.14 | 6.36 |

Each of the above analyses was performed by zone refining a silicon rod formed from the feed, condensate or residue, as the case may be, followed by a resistivity determination from which the concentration of impurities may be calculated, which technique is known to those skilled in the art.

Since it is believed that the initial condensate formed is higher in impurities due to the presence of phosphine, a purer product may be obtained by discarding the first 5–25 percent by volume or weight of the condensate, or if desired the trichlorosilane may be initially passed through a distillation column to remove 5–25 percent of the feed from the top of the column before feeding the balance of the feed to equipment such as described above.

As will be obvious to those skilled in the art after a reading of the preceeding material, the temperature of evaporation may be varied depending upon the pressure of the system, i.e., the higher the pressure, the higher the temperature at which the impure trichlorosilane may be maintained without boiling. For example, in some installations it may be desirable to maintain the pressure of the system at an absolute pressure of between 1 and 4 atmospheres. At such pressure, the boiling point of the trichlorosilane will be between about 31.8° C. and 70° C., and the temperature of the heating coils must be accordingly raised. Of course, higher pressures and temperatures may be employed.

It is also preferred that the differential temperature between the heating means employed and the trichlorosilane be maintained at less than 10° C. and preferably between ½° C. and 5° C. to avoid the formation of "hot spots" in the liquid which promote the decomposition of diphosphine.

In many applications, it will not be necessary to condense the trichlorosilane vapor. For example, the vapor may be directed from the evaporating chamber into a high temperature furnace where it is reduced by a hydrogen stream to form virtually pure silicon.

Also nitrogen, argon or other inert gas, as well as hydrogen, may be used to expedite the evaporation rate.

While rather specific terms have been used in describing various examples of the invention, they are not intended, nor should they be construed, as limitations on the invention as defined by the claims.

What is claimed is:

1. A method of purifying liquid phase trichlorosilane containing not more than 96 parts per billion N-type impurity, including diphosphine, which comprises the steps:

placing said liquid phase trichlorosilane containing diphosphine in a first additive-free chamber containing a heating means;

heating said trichlorosilane containing diphosphine to a temperature just below its boiling point, while at all times maintaining the temperature difference between said heating means and the trichlorosilane at less than 10° C.;

removing purified vapors of trichlorosilane from the liquid phase;

sweeping said vapors from said first chamber into a second chamber by means of an inert gas having a boiling point lower than the boiling point of said trichlorosilane, said second chamber containing condensing means;

condensing said vapor within said second chamber to produce a purified liquid trichlorosilane; and venting said inert gas from the condensate formed in said second chamber.

2. The method defined by claim 1 wherein the pressure maintained on said impure trichlorosilane is atmospheric and the temperature is maintained between 29° C. and 31.8° C.

3. The method defined by claim 1 wherein the pressure on said impure trichlorosilane is maintained between about 1 and 4 atmospheres and the temperature is maintained between ½° C. and 10° C. less than the boiling point of trichlorosilane at said pressure.

References Cited

UNITED STATES PATENTS

| | | | |
|---|---|---|---|
| 3,020,128 | 2/1962 | Adcock et al. | 23—223.5 |
| 3,188,168 | 6/1965 | Bradley | 23—223.5 X |

FOREIGN PATENTS

| | | |
|---|---|---|
| 906,617 | 9/1962 | Great Britain. |
| 929,696 | 6/1963 | Great Britain. |
| 1,072,227 | 12/1959 | Germany. |

OSCAR R. VERTIZ, Primary Examiner

G. O. PETERS, Assistant Examiner

U.S. Cl. X.R.

23—205